W. HEDGES.
Apparatus for Defecating and Evaporating Sugar Juices.
No. 1,349. Reissued Oct. 28, 1862.
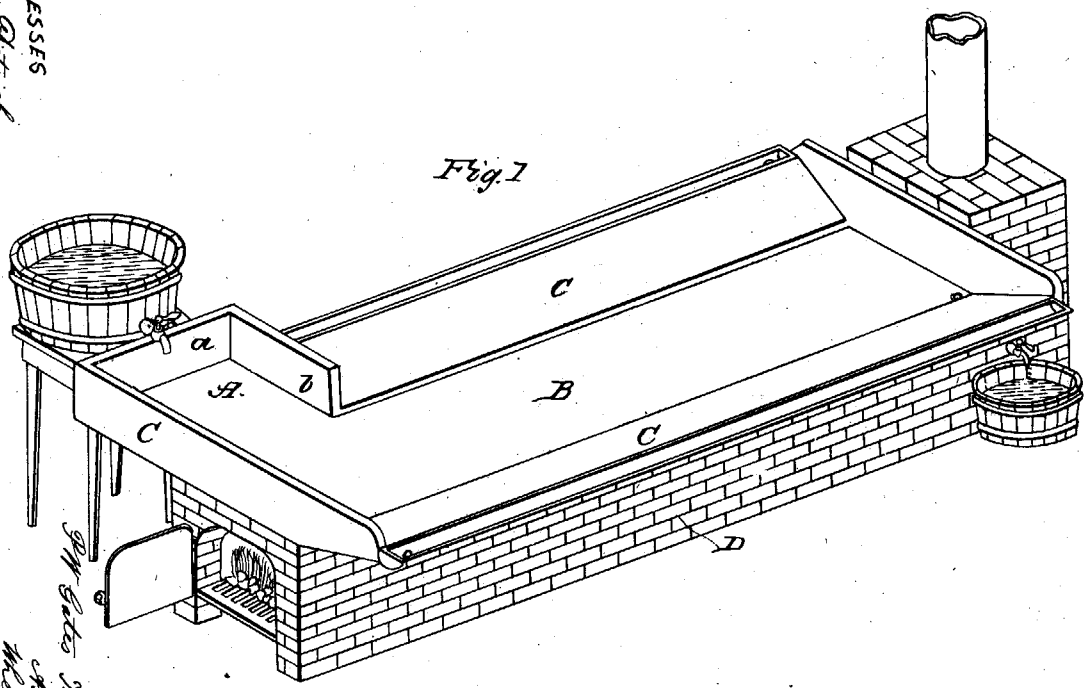
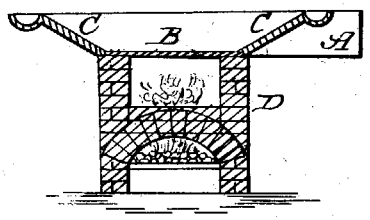
WITNESSES
Gustave Stetrich
Dewitt C Lamma
INVENTOR
P W Gates Thomas Clabourn & D W Fraser
Assignees of
Wheelan Hedges
by
Mason Fenwick & Lawrence
Their Attys.
N. PETERS, Photo-Lithographer, Washington, D. C.

UNITED STATES PATENT OFFICE.

P. W. GATES, THOS. CHALMERS, AND DAVID R. FRASER, OF CHICAGO, ILLINOIS, ASSIGNEES, BY MESNE ASSIGNMENTS, OF WHEELER HEDGES, OF SAME PLACE.

IMPROVED APPARATUS FOR DEFECATING AND EVAPORATING SUGAR-JUICES.

Specification forming part of Letters Patent No. 26,325, dated November 29, 1859; Reissue No. 1,349, dated October 28, 1862.

DIVISION No. 3.

*To all whom it may concern:*

Be it known that WHEELER HEDGES, of Chicago, in the county of Cook and State of Illinois, did invent a new and Improved Mode of Evaporating Sugar and Sirup Juices, for which Letters Patent were granted to WHEELER HEDGES and P. W. GATES, as assignees of his sole right, title, and interest therein, which Letters Patent were again assigned to P. W. GATES, THOMAS CHALMERS, and DAVID R. FRASER, of the city, county, and State above named; and we, the undersigned, assignees as aforesaid, believing that the said patent is inoperative and invalid by reason of a defective specification, which defect has arisen from inadvertence and mistake, do hereby surrender the same and file amended specifications, and request that new Letters Patent under divisions numbered 1, 2, 3, and 4 may be issued to us for the same invention for the residue of the period for which the original patent was granted, on the said amended specifications, which, together with the accompanying drawings, we do hereby declare to be a more full, clear, and exact description of the said WHEELER HEDGES'S new and improved mode of evaporating sugar and sirup juices.

Figure 1 is a perspective view, and Fig. 2 a vertical cross-section, of the evaporator and defecator pan constructed according to WHEELER HEDGES'S invention.

Similar letters of reference in the figures indicate corresponding parts.

This invention consists, under this patent, in an evaporator-pan constructed with a defecating-apartment, so that the juice, as it flows into the pan, shall be heated up gradually until it comes to the cleansing-point, and thus obviate the difficulty attending the running in of the juice directly over the fire, where it heats too rapidly and is liable to be mixed and the feculent matter boiled into the juice, and the juice thus injured in taste and clearness.

To enable others to make and use this invention, we will proceed to describe the same in connection with the drawings.

A is the defecating-apartment of the pan B. Its bottom is on the same plane with the bottom of the pan, and its sides *a b c* are vertical and rise to a height equal to the depth of the pan. Its form is rectangular—that is, so far as it is inclosed—and in size or capacity it may be in about the proportion with respect to the capacity of the pan shown in the drawings. There is no partition between the defecating-apartment and the pan at the point * *, and therefore a free passage between the two is allowed.

In the drawings the sides of the pan are set very much inclined, as shown at C C, and thus set they form nearly flat beaches for floating scum and feculent matter thrown off by the juice under the action of the heat to deposit upon. The ends of the pan are vertical.

It will be evident that the defecator, by being located laterally to the side margin of the bottom of the pan and to the inner side margin of the flame-flue of an arch whose wall is built out under the defecator, constitutes a hot-air apartment to the pan, into which the juices are first introduced, and there gradually heated before they flow over the bottom of the pan, where the fire is acting with all of its intensity. In the drawings the wall of the arch is not shown as built out under the defecator; but in practice such construction is adopted.

The construction, arrangement, and operation of the defecator A is such, by reason of its remoteness from the direct action of the flame of the fire, that the juice while in it is not caused to boil, although kept near the boiling-point. Consequently as fast as the juice falls in an almost immediate and perfect defecation takes place, the green scum being prevented from flowing out of the defecator by the strong current of ebullition setting in over the fire-surface of the pan. Time is allowed to remove such scum before it is boiled in the sirup, thereby avoiding the deleterious influence that would ensue by extracting the juice of the fibrous substance or scum and mingling it with the sirup.

The details of construction of the defecator and the style of that portion of the pan not designated as the defecator herein set forth, as well as that of the arch, may be changed in various ways without departing from the invention involved, and therefore we do not desire to be limited to the same. For instance, the bottom of the defecator might connect with the bottom of the pan by a shallow step. Again, the bottom of the defecator might be slightly inclined or formed of a series of steps which are inclined. So, also, might the defecator be constructed on a pan with vertical sides which are isolated from the heat of the fire. The arrangement shown evaporates the juices by fire applied under the pan; but it is obvious that steam-coils arranged on the upper surface of the bottom of the pan, after the manner shown in Division No. 1 of this reissue, can be employed to facilitate the operation or to carry it on wholly. This, however, is optional, and constitutes no part of the claim here.

What is claimed under this patent is—

An evaporating-pan constructed with a defecating-apartment, for the purpose set forth.

P. W. GATES.
THOS. CHALMERS.
DAVID R. FRASER.

Witnesses:
J. L. FORGO,
WILL. A. BALL.